United States Patent [19]

Ford et al.

[11] Patent Number: 5,474,263
[45] Date of Patent: Dec. 12, 1995

[54] REACTION WHEEL AND METHOD OF SAFING WHEEL

[75] Inventors: Kevin M. Ford, Georgetown, Tex.;
Terence J. Marshall, Glendale, Ariz.

[73] Assignee: Honeywell Inc., Minneapolis, Minn.

[21] Appl. No.: 28,255

[22] Filed: Mar. 9, 1993

[51] Int. Cl.⁶ .................................................. B64G 1/28
[52] U.S. Cl. ......................................... 244/165; 74/5.12
[58] Field of Search ............................. 244/165; 74/5.1, 74/5.12, 5.14

[56] References Cited

U.S. PATENT DOCUMENTS

| | | | |
|---|---|---|---|
| 3,019,662 | 2/1962 | Gahn | 74/5.1 |
| 3,020,769 | 2/1962 | Bentley et al. | 74/5.1 |
| 3,311,326 | 3/1967 | Scotto et al. | 74/5.1 |
| 4,322,984 | 4/1982 | Lasker et al. | 74/5.1 |
| 4,606,239 | 8/1986 | Guerin | 74/5.12 |
| 4,872,357 | 10/1989 | Vaillant De Guelis et al. | 74/5.1 |
| 5,390,554 | 2/1995 | Silvent | 74/5.12 |

FOREIGN PATENT DOCUMENTS 2351495  4/1975  Germany ........................ 244/165

OTHER PUBLICATIONS

Patent Disclosure No. A6614652, Teldix RWA Rotor Vibration Suppression Via Tuning Details and RCA RWA Rotor Vibration Suppression Via Strapping and Pyrotechnics Details.

*Primary Examiner*—William Grant
*Attorney, Agent, or Firm*—Thomas A. Rendos

[57] ABSTRACT

An improved reaction wheel assembly and method is provided whereby a reaction wheel assembly contains a safing mechanism for securing the assembly. A rotor shaft assembly and bearings are provided whereby a reaction wheel assembly selectively may be either safe or operational, and the safing assembly provides for application of stabilizing force longitudinally along the axis of rotation of a rotor shaft. Further, a method of providing momentum stabilization to a vehicle using this apparatus is provided. A safing mechanism for releasably securing a reaction wheel rotor assembly of a satellite during launch is disclosed.

6 Claims, 6 Drawing Sheets

REACTION WHEEL AND METHOD OF SAFING WHEEL

BACKGROUND OF THE INVENTION

The present invention comprises a reaction wheel assembly used to provide reaction torque in momentum stabilization of vehicles. In particular, the present invention comprises an improved reaction wheel assembly in which a rotor safing mechanism is employed. In the present invention, the rotor safing mechanism is used to isolate the rotor bearings from deflective forces that are incident upon the reaction wheel assembly during periods of high vehicular stress. In the case of a satellite, for example, the present invention is used in safing the rotor mechanism during launch of the satellite, a time during which damaging forces are brought to bear upon the relatively delicate components of the reaction wheel assembly.

During launch of a satellite, forces (or "loads") are generated by the reaction forces of a high inertia rotor structure exposed to vibration environments during payload launch and ascent. Effective bearing isolation using the present invention facilitates the use of smaller bearing systems. Further, savings in power consumption may be brought about by use of the present invention. Further, the present invention provides advantages as to size, cost and mass of the components in a reaction wheel assembly.

Reaction wheel assemblies of the type disclosed in the present invention include a rotor which acts like an axle positioned between two support points. The support points in the present invention are comprised of bearings, and the rotor is allowed to spin within bearings located at either end of the rotor.

Momentum stabilization is achieved in most reaction wheel assemblies by the use of a rotor web structure, which proceeds laterally and perpendicular to the rotor itself, with a relatively large mass at the distal end of the rotor assembly. During operation of reaction wheel assemblies, the forces acting upon the bearings are generated by bearing preload forces, misalignment forces, and residual rotor imbalances. Further, some undesirable forces that occur during operation may be caused by the housing precessional rate.

In the design of reaction wheel assemblies, the mass of the structural components is a critical factor. Since reaction wheel assemblies typically are used in conjunction with spacecraft, satellites, aircraft, or other vehicles that are in motion, the mass of the assembly is very important. Of course, the performance of a flight vehicle is greatly affected by gravity, and as in all space or satellite components, the weight of the component must be kept to an absolute minimum, while still maintaining the integrity and strength to carry out the mission.

There are several components of reaction wheel assemblies that must be minimized in terms of total mass and size to provide the most efficient operation, using the least amount of mass. For example, the mass of a reaction wheel assembly may be reduced by using smaller bearings at either end of the rotor. One of the advantages of using smaller bearings is that the viscous drag is considerably reduced, and correspondingly, the total power consumption of the reaction wheel assembly is reduced. Power consumption is a critical factor in satellite or spacecraft systems because the majority of the power consumed and used on a spacecraft or satellite must be carried into orbit in the form of batteries or other energy storage devices, and these sources of power are quite heavy. Thus, the less power consumed by the reaction wheel assembly, the greater its efficiency for its intended purpose.

If smaller bearings are used in a reaction wheel assembly, the forces brought to bear upon the bearings during launch may exceed the operating capability of the bearings. During launch, resultant forces are applied to the rotor web assembly, and a large moment of force is applied to the bearings from the intense vibrational environment of launch conditions. Further, during launch, harmonic forces are sometimes generated by the natural frequencies which may add upon themselves, producing a harmonic effect that may provide extremely high forces to the bearings within the reaction wheel assembly.

If the bearings of the reaction wheel assembly are subjected to forces that are too great, they will fail, causing failure of the entire reaction wheel assembly. Of course, without the reaction wheel assembly, a satellite, spacecraft, or other vehicle may lose its ability to direct itself along the correct flight path, resulting in a disastrous failure of the mission.

The problem is one of isolating or "safing" the rotor assembly mass from bearing loads that occur during periods of high vehicular stress, such as during launch of a satellite. Several different approaches have been proposed in an attempt to solve the problem, but until now, none of these approaches provided a satisfactory solution.

At least two prior methods have been used to restrain the rotor web of a reaction wheel assembly. The first method is a captivating mechanical rotor method, in which the outer rim of the rotor web assembly (which contains the large amount of mass necessary for the rotor function) is prevented from deflection by physical connection (or tying) the rotor to the housing. The primary disadvantage of the captivating mechanical restraint method is weight inefficiency and mechanical complexity while also requiring pyro release techniques for subsequent rotor operation. For example, the design must facilitate the release of the rotor web during operation of the reaction wheel assembly while still adequately securing the rotor web assembly during launch. The release mechanism is clumsy, and it is an inefficient method of containing the rotor web.

Other prior art methods attempt to solve the problem by adding mass to the rotor itself, thereby providing a dynamic response of the rotor to the forces brought to bear upon the rotor. In such applications, it is said that the rotor is "tuned" by changing the natural frequency of the rotor to a level such that vibrational tendencies are kept to a minimum.

For example, the addition of mass to the rotor may change the natural frequency of the rotor, thus helping to "dampen" the frequency response of the rotor, by counteracting the gain that is seen during periods of stress, such as during a launch. The drawback to this prior art method is that the rotor may only be tuned to specific environmental frequencies, and if a stress environment provides a frequency for which the rotor cannot be correctly tuned, dampening of vibrational forces will not occur. Further, there is a relatively narrow bandwidth for these types of rotor safing assemblies. Another drawback of this prior art method is that applying mass to the rotor itself is known to cause rotational problems and instability of the rotor due to inferior balance characteristics of these systems.

The present invention, on the other hand, solves the problem of providing a safing mechanism that will adequately secure a reaction wheel assembly in a high stress environment, and then facilitate a release of the assembly to allow free movement of the rotor during operation of the reaction wheel assembly. In the present invention, the rotor bearing assembly is safely stowed by setting the rotor structure into a preloaded configuration during the time period of high vehicular stress, such as during the launch and ascent phase of a satellite mission.

The preloaded configuration of the present invention restrains deflection of the rotor structure thereby minimizing or eliminating vibrational transmission from the rotor structure to the delicate bearing assembly. All of these benefits may be accomplished while using a smaller bearing structure comprising less mass, at reduced cost, and in a smaller size than bearing systems used in the prior art.

SUMMARY OF THE INVENTION

The invention comprises an improved reaction wheel assembly containing a safing mechanism for securing the assembly. In the invention, a rotor shaft having a proximal end, a distal end, and a body between the proximal and distal ends is provided whereby the rotor shaft forms an axis of rotation. Further, bearings are adapted for stabilization of the rotor shaft, wherein the bearings are positioned generally at the distal end and proximal end of the rotor shaft. A rotor is mounted upon the rotor shaft and directed outward from the rotor body, the rotor being adapted to rotate about the axis of rotation. Further, a safing mechanism for releasably securing the rotor during periods of vehicular stress is provided. The safing mechanism comprises the application of stabilizing force longitudinally along the axis of rotation.

Further, the method of providing momentum stabilization to a vehicle using the apparatus described above is provided.

Additionally, the apparatus provided above comprises a safing mechanism further comprising a means for capturing the reaction wheel assembly longitudinally by securing the rotor.

In another aspect of the invention, the apparatus as disclosed above is presented such that the means for capturing further comprises a safing pin assembly.

In another aspect of the invention, the vehicle is a satellite, and the safing pin assembly is adapted for providing force longitudinally along the axis of rotation of the rotor in eliminating or reducing undesirable vibrational forces that occur during launch of the satellite.

In another aspect of the invention, the safing pin assembly further comprises one or more compression release springs that may be releasably engaged during launch.

In yet another aspect of the invention, the safing pin assembly further comprises a seat, the seat further including a hub, said hub engaging a frame, whereby the reaction wheel assembly is stabilized by frictional engagement of the hub with the frame.

In another aspect of the invention, a reaction wheel assembly for providing reaction momentum stabilization forces to a satellite is presented, wherein a rotor shaft having a proximal end, a distal end, and a body between the proximal end and distal ends is presented, the body of the rotor shaft forming an axis of rotation. Furthermore, bearings are adapted for stabilization of the rotor shaft, the bearings being positioned generally at the distal end and the proximal end of the rotor shaft. The bearings comprise either fixed or floating bearings. A rotor is mounted upon the rotor shaft and directed outward from the rotor body, the rotor being adapted to rotate about the axis of rotation. The rotor further comprises a rotor web.

Further, a safing mechanism is included for releasably securing the rotor shaft and rotor during periods of launch, wherein the safing mechanism comprises the application of stabilizing force longitudinally along the axis of rotation, the safing mechanism further comprising a safing pin assembly that provides a preloading force upon the reaction wheel assembly longitudinally by securing the rotor shaft in relation to the rotor, wherein the safing pin assembly provides stabilizing forces along the axis of rotation to reduce the amount of deflection of the rotor web during launch.

In another aspect of the invention, the method of providing momentum stabilization to a satellite using the above apparatus is presented.

Further, the reaction wheel assembly is provided whereby the safing pin assembly further comprises a locking means.

In another aspect of the invention, the reaction wheel assembly is provided whereby the locking means comprises a shaped memory alloy.

In still another aspect of the invention, the reaction wheel assembly is presented whereby the locking means comprises a manual locking means, wherein locking is accomplished prior to launch. In another presentation of the invention, the reaction wheel assembly is provided wherein the locking means comprises a solenoid. Further, the reaction wheel assembly is provided wherein the locking means comprises a pyrotechnical device.

In another aspect of the invention, the invention comprises a safing mechanism for releasably securing a reaction wheel rotor assembly of a satellite during launch. A rotor is included, wherein the rotor comprises a shaft directed longitudinally along an axis of rotation. The rotor further comprises a rotor web assembly directed generally perpendicular to the shaft, wherein the rotor web assembly provides momentum stabilization to the reaction wheel. Additionally, a safing pin assembly for releasably securing the rotor during launch of the satellite is provided.

In another aspect of the invention, a method of securing a reaction wheel assembly is provided whereby longitudinal force is asserted along the axis of rotation. In that embodiment, a safing pin is provided as part of the reaction wheel assembly, wherein the safing pin is oriented longitudinally along the axis of rotation of the reaction wheel assembly. As a further step, the safing pin is releasably secured within the reaction wheel assembly, thereby stabilizing the reaction wheel assembly against undesirable deflecting forces during launch.

In another aspect of the invention, a safing pin is comprised of a shaped memory alloy, wherein a voltage is applied to the shaped memory alloy to secure the safing pin within the reaction wheel assembly.

In another aspect of the invention, the reaction wheel assembly further comprises a hub and frame, wherein the safing pin is secured by contact of the hub with the frame.

In another aspect of the invention, the reaction wheel assembly further comprises a bearing slider housing wherein the safing pin is secured by contact of the safing pin with the bearing slider housing.

Description of the Preferred Embodiments

Figure 1:
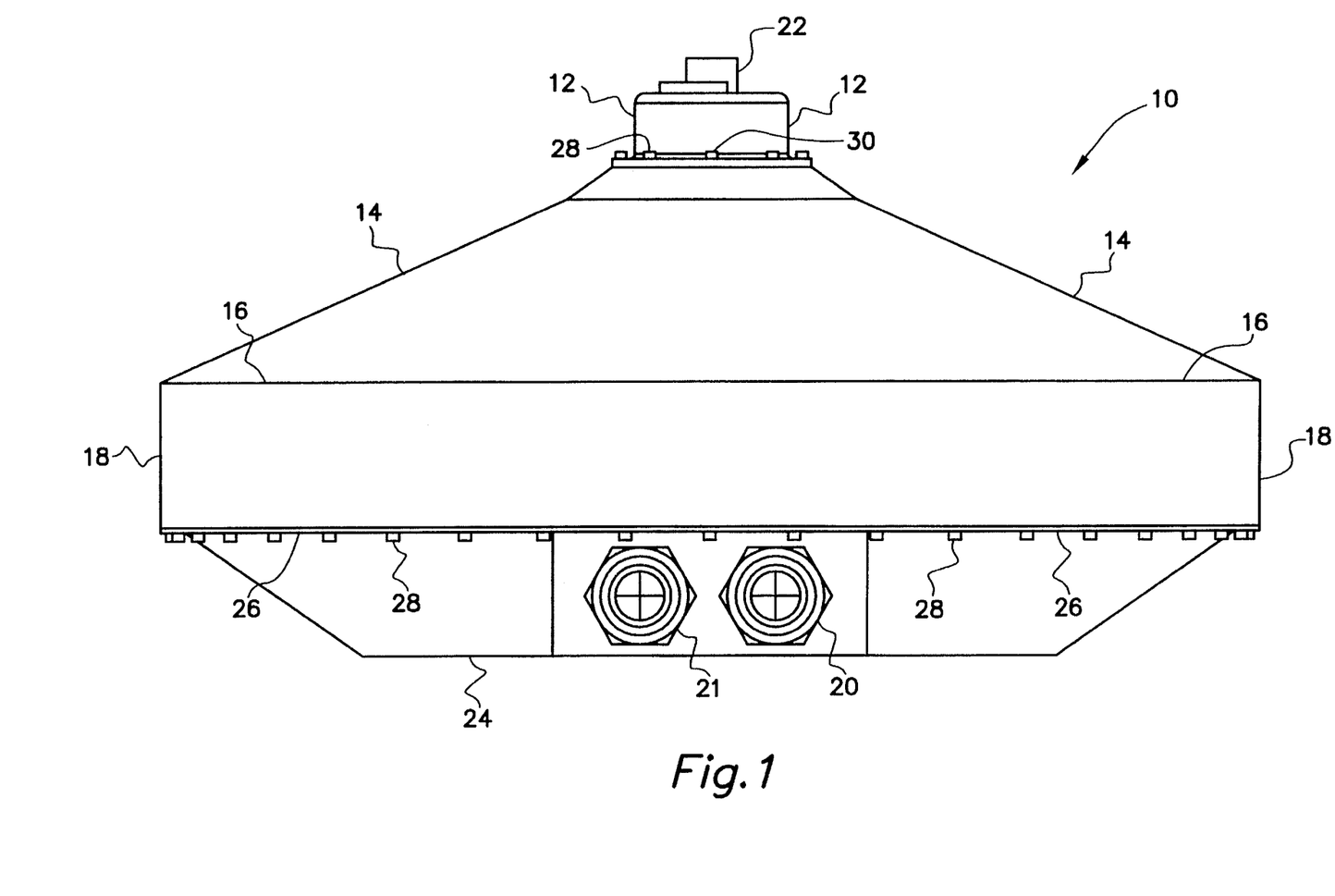
FIG. 1 provides an exterior view of the entire reaction wheel assembly unit.

FIG. 1 shows an exterior view of the reaction wheel assembly 10. A cap housing 12 provides protection for the top portion of the reaction wheel assembly 10. Cover housing 14 protects the interior components of the rotor assembly, and structural edge 16 can be seen extending around the periphery of the reaction wheel assembly 10. Side housing 18 protects the side portion of the reaction wheel assembly 10, while left connector port 20 and right connector port 21 provide apertures through which electrical connections are made with the reaction wheel assembly 10. Alignment cube 22 extends from the upper surface of cap housing 12, and case housing 24 forms the protective envelope around the lower portion of the reaction wheel assembly 10. The cover/case interface 26 is shown with a series of exterior bolts 28 along its edge, forming a mating surface between the side housing 18 and the case housing 24.

Figure 2:
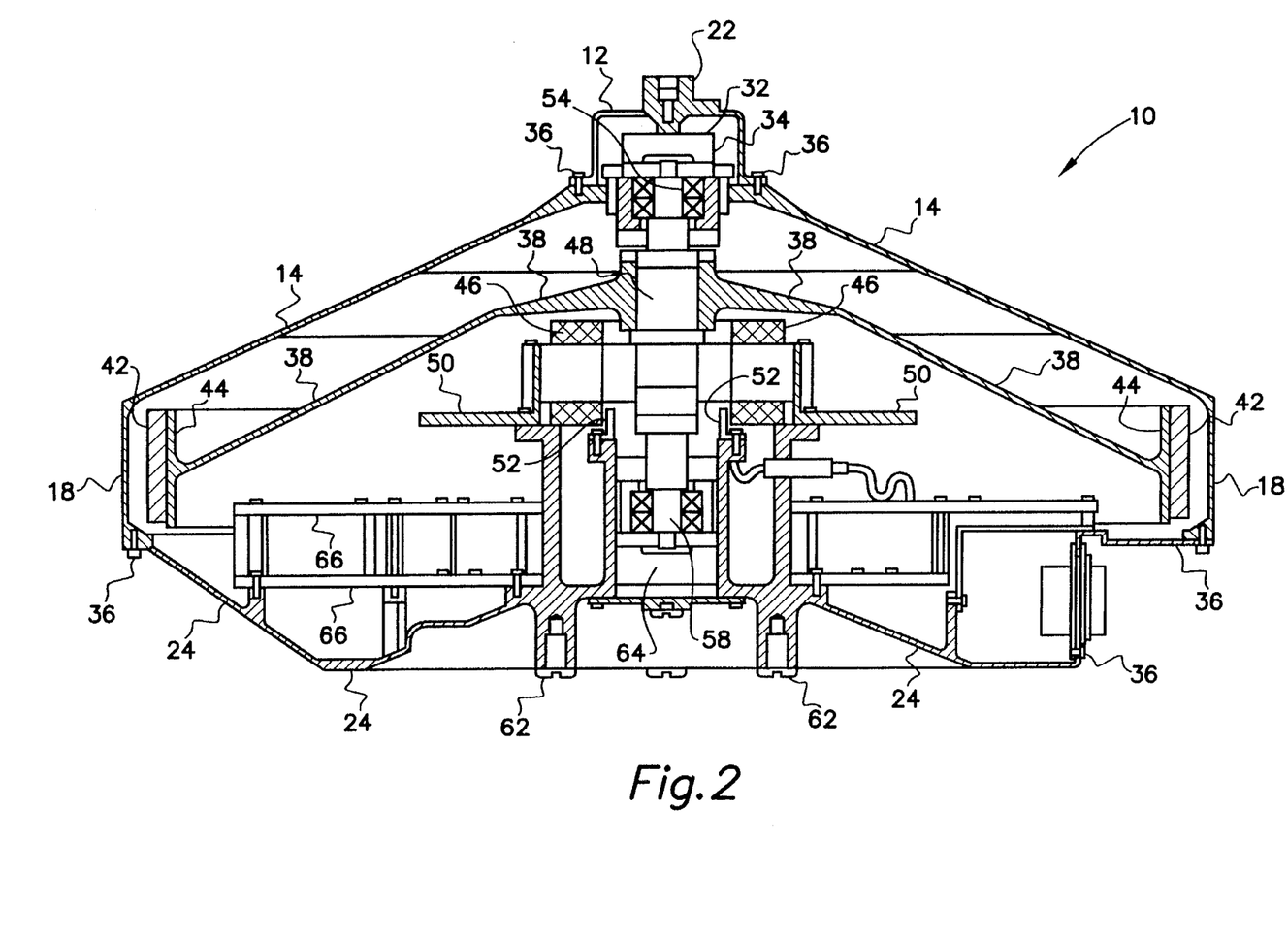
FIG. 2 shows a cross-sectional view of the interior of a reaction wheel assembly unit, with the housing portion removed, showing the details of the rotor and rotor assembly.

FIG. 2 provides a detailed view of the interior of the reaction wheel assembly. In that figure, reservoir 32 is seen near the top of the figure, directly under the alignment cube 22. A fixed bearing cartridge 34 is seen at the upper end of the rotor, surrounding the reservoir 32. An O-ring 36 may be seen on either side of the upper end of the rotor shaft 48, and the O-ring proceeds in a circular path around the periphery of the upper end of the rotor. The O-ring seals the interior of the reaction wheel assembly to prevent passage of gases to or from the reaction wheel assembly interior space.

Rotor webs 38 are seen extending generally perpendicular from the rotor shaft 48. At the outer periphery of each of the rotor webs 38 are the rotor web rings 44. Releasably attached to the rotor web rings 44 are the inertia rims 42. The inertia rims 42 are the primary mass containing structure of the rotor web assembly. At the lower end of the rotor shaft 48 are floating duplex bearings 58. These bearings, along with the fixed bearings 54 at the upper end of the rotor shaft, prevent radial movement of the rotor shaft when exterior forces, such as vibrational forces produced during launch, are applied to the rotor shaft 48.

Floating bearing cartridge 64 contains the floating duplex bearing 58 as seen at the bottom portion of FIG. 2. Further, mounting interface flanges 62 are seen at the lower margin of the case housing 24. These mounting interface flanges are the primary structure by which the reaction wheel assembly is mounted in its operational configuration upon a satellite, spacecraft, or other vehicle.

As seen previously in FIG. 1, FIG. 2 also shows cap housing 12 and cover housing 14 on its exterior surface. Side housing 18 and case housing 24 may be seen on the lower side of the reaction wheel assembly. O-rings 36 may be seen at the lower edges of the housing, where the interface between the outside air and the sealed interior of the reaction wheel assembly is located.

Torque motors 46 may be seen on either side of the rotor shaft 48, and directly below the rotor webs 38. The torque motors 46 rest upon motor mounts 50 which extend laterally from beneath the torque motors 46 out towards the lower edge of the rotor webs 38. Hall sensors 52 may be seen on either side of the rotor shaft, just below the midline of the rotor shaft 48. Hall sensors are receptive to changes in magnetic eddy currents, thus providing information regarding speed and direction. Electronic assembly 66 may be seen in the interior space of the reaction wheel assembly, below the rotor web 38 on the left side of FIG. 2.

Figure 3:
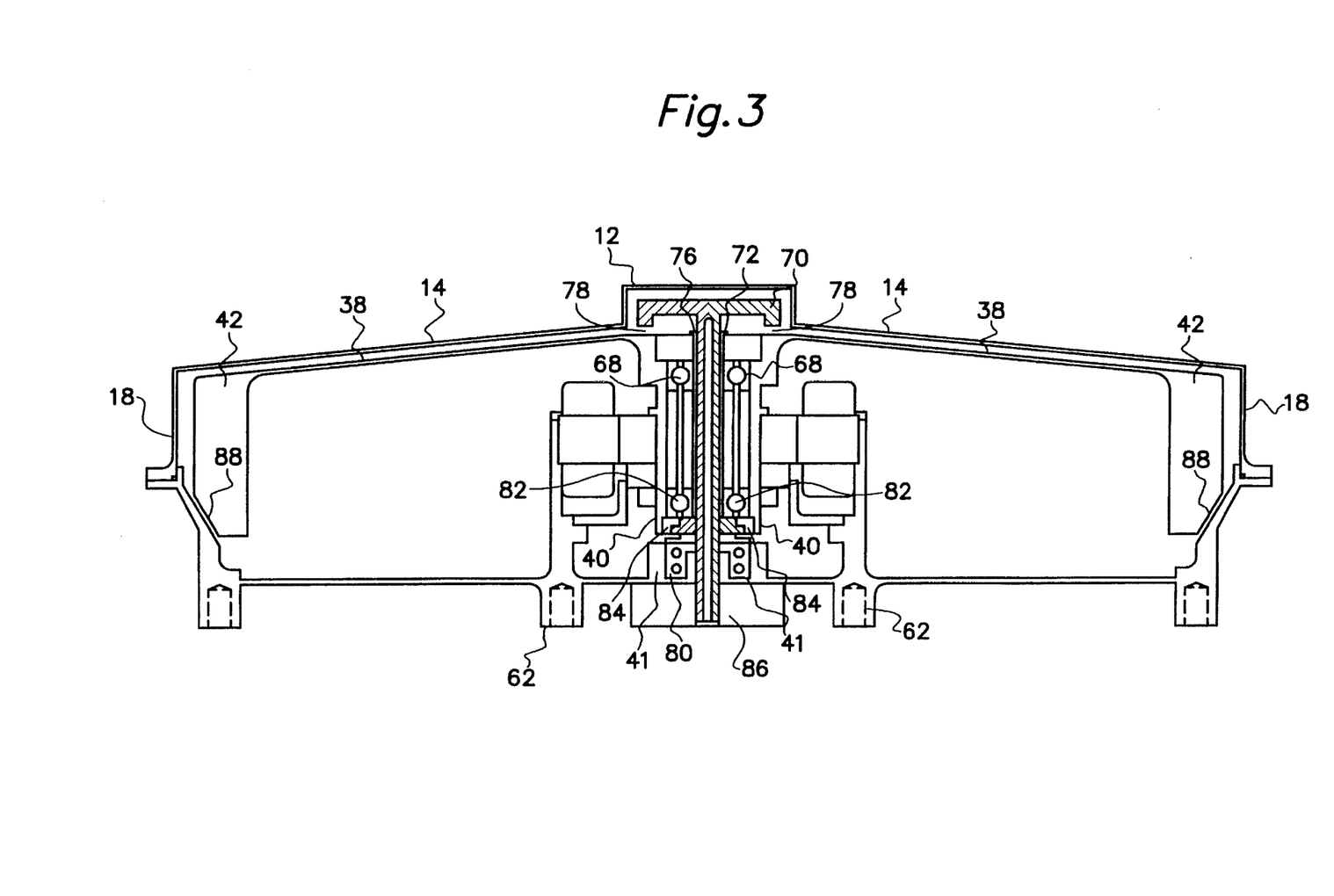
FIG. 3 provides a cross-sectional view of the reaction wheel assembly safing mechanism, showing the central spindle which runs longitudinally and parallel to the rotor.

FIG. 3 shows a cross-section of the reaction wheel assembly, in which a fixed simplex bearings 68 are provided at the upper portion of the rotor assembly. The safing pin 70 may be seen in a T-shaped configuration extending from a position just below the cap housing 12 parallel to the rotor to the release actuator housing 86 at the lower portion of the reaction wheel assembly. The safing pin operates to engage and disengage, thereby providing a safing mechanism or a "stop" to radial movement of the rotor during periods of high vehicular stress, for instance, during launch. The main shaft of the safing pin 70 extends down through the spindle 76, which itself is contained within the bearing slider housing 72. The bearing slider housing 72 may be seen in cross-section in FIG. 3 as the dark black lines on either side of the spindle 76. The bearing slider housing 72 contains the fixed bearing assemblies which stabilize the rotor. A more detailed view of the safing pin and bearing slider housing arrangement is seen in FIGS. 4–6.

FIG. 3 depicts the safing pin assembly in its operational configuration, wherein it facilitates free movement of rotor webs 38. The operating gap space 78 may be seen on either side of the T-shaped portion of the safing pin 70. This space, which is usually from about 0.003 inches to about 0.020 inches in width, allows free movement of the rotor web assembly during the operational phase of the reaction wheel assembly.

During launch of a satellite containing a reaction wheel assembly, however, the safing pin 70 extends downward, eliminating the operating gap space, thereby preventing rotational movement of the rotor assembly.

Figure 4:
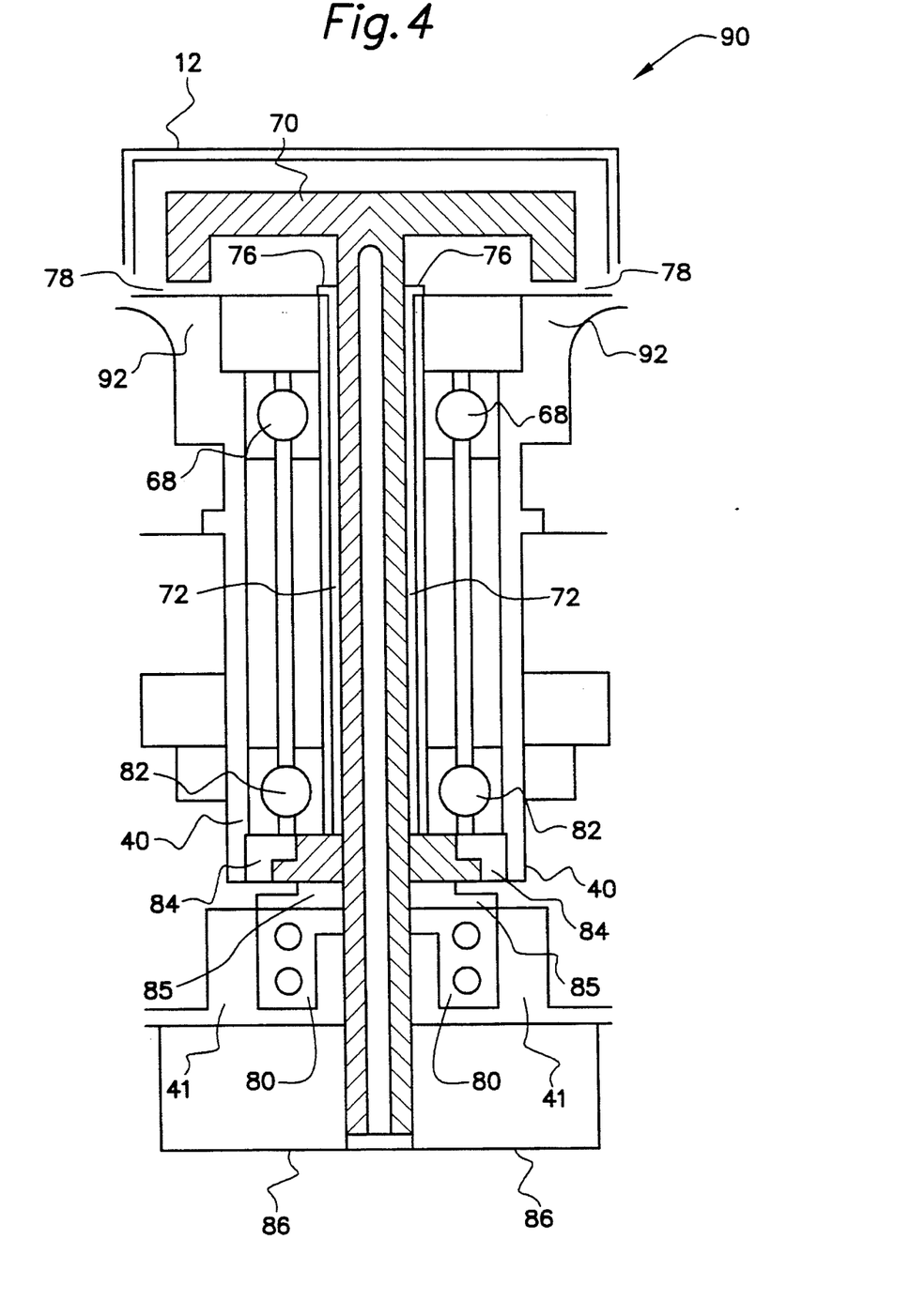
FIG. 4 shows a close-up view of one aspect of the safing mechanism of the present invention in the operational mode (i.e., during flight).
Figure 5:
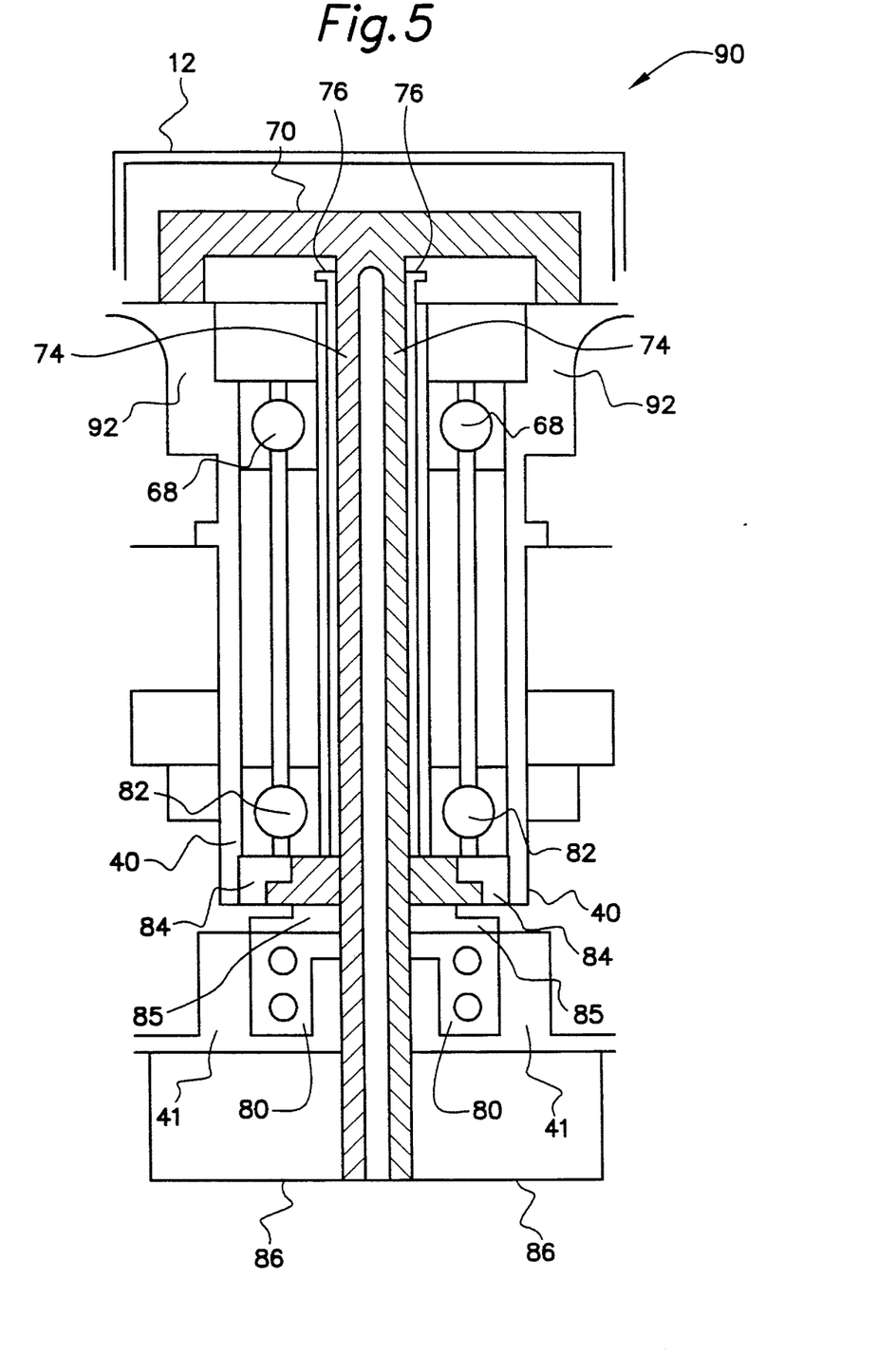
FIG. 5 shows one aspect of the present invention in the preloaded configuration (i.e., during launch).
Figure 6:
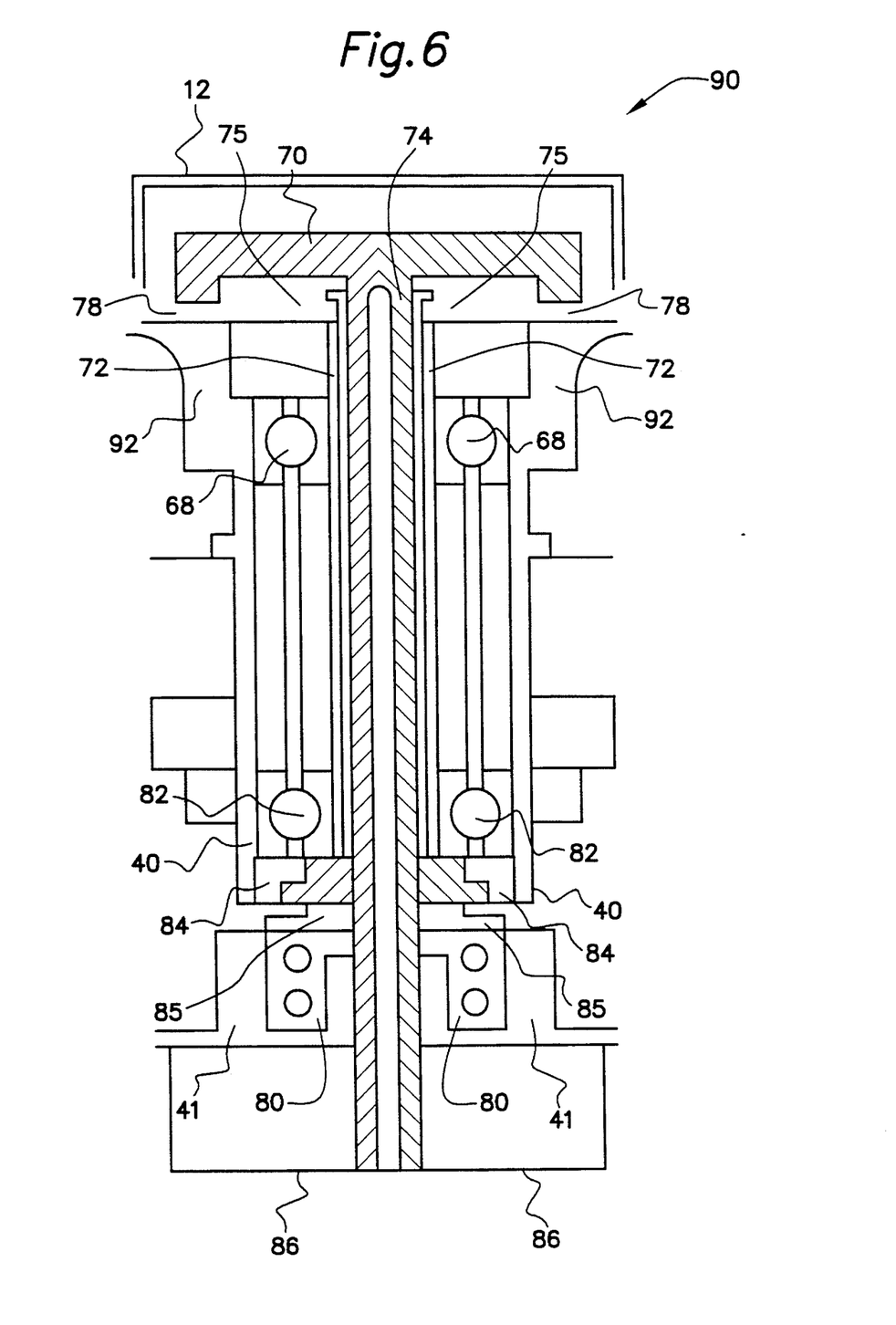
FIG. 6 shows an alternative embodiment of the present invention whereby the safing mechanism is in the preloaded configuration using an alternate method of loading the safing pin assembly.

Inner rotor retainers 84 are seen on either side of the safing pin, and during safing operations, they engage frame 41 as seen more clearly in FIGS. 4–6. Further, floating simplex bearings 82 are seen in FIG. 3 at the lower end of the rotor assembly.

Outer rotor seat 88 is seen on the outer edge of the inertia rims 42 in FIG. 3. The clearance between inertia rims 42 and the housing at the outer rotor seat 88 is typically and preferably between about 0.010 inches and 0.020 inches. The maximum amount of gap typically utilized in this space is 0.020 inches. The rotor assembly is safed using the safing pin 70, and the gap is eliminated just as the operating gap space 78 is eliminated with regard to the safing pin during safing of the rotor assembly. A frictional contact exists between inertia rim 42 and side housing 18 which stabilizes and safes the rotor assembly, preventing radial movement of the rotor in relation to the bearings.

FIG. 4 shows the safing mechanism of the present invention in its operational mode whereby the rotor assembly is free to turn. Operating gap space 78 may be seen at the top portion of the figure, and inner rotor hub seats 92 are seen on either side of the safing pin where they engage the outer T-shaped portion of the safing pin 70. The safing pin is seen within its spindle 76, which in turn is enclosed by the bearing slider housing 72. In the safing of the rotor, hub 40

(which is seen along either side of the spindle running longitudinally parallel to the spindle), engages frame 41. The hub 40 is continuous with and forms part of the housing assembly.

When the hub 40 engages the frame 41, the rotor assembly is safed, and unwanted vibrational forces are distributed away from the bearings, the load path being changed to provide the load through the rotor web to the housing located at outer rotor seat 88 as seen in FIG. 3.

Further, nut spring reservoir retainer 85 contacts the compression release springs 80 (FIG. 5), which provides a slight back pressure to dampen longitudinal vibrations of the rotor assembly while the rotor assembly is in the safe mode. In the safe mode, the rotor provides between about 100 and 300 pounds of force against the housing at the outer rotor seat 88 as seen in FIG. 3. This force represents a force that would otherwise be transmitted with structural gain at resonant frequencies to the bearings along the central axis of the reaction wheel assembly were it not for the safing of the rotor assembly.

Release actuator housing 86 is seen on either side of the safing pin, and at the lower portion of the reaction wheel assembly. There are several methods of providing longitudinal displacement of the safing pin to effect the safing of the rotor assembly, and in some applications, the mechanism for safing the rotor will be contained within the release actuator housing.

For example, the preferred method of safing the rotor is by using a shaped memory alloy, whereby the safing pin is comprised of an alloy that exhibits thermal properties when it is supplied with a voltage. In this case, in the preferred embodiment, a voltage may be applied to the safing pin prior to the time that safing of the rotor is desired. When the voltage is applied, the shaped memory alloy will be transformed from a metallic phase to a different phase, thus, changing the size characteristics of the safing pin, and causing the operating gap space 78 to close between the safing pin 70 and the inner rotor hub seat 92.

In the case of a shaped memory alloy, the safing pin would be comprised of the alloy, and the voltage necessary to provide the appropriate closing of the operating gap space would depend upon the alloy used and the particular rotor to which it was applied. A person skilled in the art would recognize that many types of shaped memory alloys could be used in the present application.

As an alternate means of safing the rotor assembly, a manual method may be used whereby the safing pin is manually locked into position using bolts. Typically, these bolts would be applied at the lower portion of the safing pin 70, near the release actuator housing 86. Persons skilled in the art will recognize that bolts could be applied in this manner, whereby the rotor web mechanism is made safe.

In another embodiment, a solenoid could be utilized at the location of the actuator housing 86, in which the safing pin could be engaged or disengaged, thereby safing the rotor assembly. Further, pyrotechnics could be utilized to safe the rotor assembly, whereby an exploding bolt or other destructive material is used to safe the assembly, to be later remotely discharged, thereby setting free the safing pin and allowing the rotor assembly to rotate during flight operations. This method, and other methods, are recognized as appropriate in the safing of the rotor assembly of the present invention. Persons skilled in the art are familiar with such actuating devices.

In FIG. 5, the safing mechanism 90 may be seen. A hub 40 is in frictional engagement with frame 41 on both sides of the lower portion of the reaction wheel assembly. This engagement, along with the engagement of safing pin 70 to inner rotor hub seat 92 provides the frictional engagement and stability to prevent rotor rotation in conjunction with the contact of the inertia rim 42 with the side housing 18 as seen in FIG. 3. In FIG. 5, there is no operating gap space between the safing pin 70 and the inner rotor hub seat 92, indicating that the rotor is in the nonoperational or safed mode.

By safing the rotor assembly, a controlled preload of the rotor web structure is established by axially forcing the center span of the rotor onto the inner rotor hub seat 92. In the seated configuration, deflections of the rotor rim caused by vibrational environments are contained in all axes. This configuration provides safing by eliminating the transmission of the launch loads through the rotor structure to the bearings. Return of the rotor to the operational position is provided by reversing the safing mechanism utilized. For example, when using the shaped memory alloy, voltage level is removed, thereby changing the phase of the alloy, thereby returning the shape of the safing pin to a shape that will provide the operating gap characteristics needed for free turning of the rotor assembly. If an electrical actuator is used, electrical commands are sent to the actuator, which moves the safing pin into the desired location. In applications where pyrotechnics are used, the safing pin must be manually placed back into its position, and the explodable bolts or other destructive components must be replaced.

An alternate structure and method may be used to safe the rotor assembly as seen in FIG. 6. In FIG. 6, bearing slider housing stops 75 are provided on either side of the central axis of the safing pin 70, and they form a contact point to which the safing pin may be secured, allowing a secure rotor web structure.

The alternate method as shown in FIG. 6 accomplishes preloading of rotor structure in the same manner as the prior method, however, in the embodiment as seen in FIG. 6, the preload force is carried through the bearings by loading the bearing slider housing. In this condition, the bearings remain isolated from the rotor reaction loads, but the bearings will be subjected to the established preload capacity which is set on the rotor structure. The alternative approach as seen in FIG. 6 may prove beneficial by reducing the preload safing pin package size which is used in the reaction wheel assembly. Thus, the method and apparatus as seen in FIG. 6, whereby bearing slider housing stops absorb deflective forces, provides an effective alternative so long as the required rotor safing preload force remains within the axial load capacity of the bearings.

The present disclosure is intended to cover all such modifications as fall within the scope of the appended claims, including equivalents.

What is claimed is:

1. An improved reaction wheel assembly containing a safing mechanism for securing the assembly, comprising:

a rotor shaft having a proximal end, a distal end, and a body between the proximal and distal end, the body of the rotor shaft forming an axis of rotation;

bearings adapted for stabilization of the rotor shaft, the bearings positioned generally at the distal end and proximal end of the rotor shaft;

a rotor mounted upon the rotor shaft and directed outward from the rotor body, said rotor adapted to rotate about the axis of rotation;

a safing mechanism for releasably securing said rotor during periods of vehicular stress, wherein said safing mechanism comprises a safing pin assembly for securing the rotor by providing a stabilizing force longitudinally along the axis of rotation of the rotor to reduce undesirable vibrational forces, said safing pin assembly including compression release springs that may be releasably engaged during periods of vehicular stress.

2. The apparatus of claim 1, wherein the safing pin assembly further comprises a seat, wherein said assembly further includes a hub, said hub engaging a frame, whereby the reaction wheel assembly is stabilized by engagement of the hub with the frame.

3. A reaction wheel assembly for providing reaction momentum stabilization forces to a satellite during launch, comprising:

a rotor shaft having a proximal end, a distal end, and a body between the proximal and distal end, the body of the rotor shaft forming an axis of rotation;

bearings adapted for stabilization of the rotor shaft, said bearings positioned generally at the distal end and proximal end of the rotor shaft;

a rotor mounted upon the rotor shaft and directed outward from the rotor body, said rotor adapted to rotate about the axis of rotation, said rotor further comprising a rotor web;

a safing mechanism for releasably securing said rotor shaft and rotor during periods of launch, wherein said safing mechanism comprises the application of stabilizing force longitudinally along the axis of rotation, said safing mechanism further comprising a safing pin assembly that provides a preloading force upon the reaction wheel assembly longitudinally by securing the rotor shaft in relation to the rotor, wherein the safing pin assembly provides stabilizing forces along the axis of rotation to reduce the amount of deflection of the rotor web during launch, said safing pin assembly including a locking means having a solenoid.

4. A method of securing a reaction wheel assembly longitudinally along the axis of rotation of a rotor, comprising:

providing a safing pin comprised of a shaped memory alloy within a reaction wheel assembly, wherein the safing pin is oriented longitudinally along the axis of rotation of the reaction wheel assembly, said reaction wheel assembly containing a rotor; and releasably securing the safing pin within the reaction wheel assembly by applying a voltage to the safing pin, thereby stabilizing the rotor with regard to undesirable deflecting forces.

5. The method of claim 4, wherein the reaction wheel assembly further comprises a hub and a frame, wherein the safing pin is secured by contact of the hub with the frame.

6. The method of claim 4, wherein the reaction wheel assembly further comprises a bearing slider housing, wherein the rotor is secured by contact of the safing pin with the bearing slider housing.

* * * * *